US011226006B2

(12) United States Patent
Pede-Vogler et al.

(10) Patent No.: US 11,226,006 B2
(45) Date of Patent: Jan. 18, 2022

(54) SPINDLE POT BEARING

(71) Applicant: Saurer Technologies GmbH & Co. KG, Krefeld (DE)

(72) Inventors: Walter Pede-Vogler, Durach (DE); Otto Scheitli, Kempten (DE); Fabian Becker, Waltenhofen (DE)

(73) Assignee: Saurer Technologies GmbH & Co. KG, Krefeld (DE)

( * ) Notice: Subject to any disclaimer, the term of this patent is extended or adjusted under 35 U.S.C. 154(b) by 0 days.

(21) Appl. No.: 16/802,769

(22) Filed: Feb. 27, 2020

(65) Prior Publication Data

US 2020/0277995 A1 Sep. 3, 2020

(30) Foreign Application Priority Data

Feb. 28, 2019 (DE) .................... 10 2019 105 072.3

(51) Int. Cl.
*F16C 35/10* (2006.01)
*F16C 43/02* (2006.01)
(Continued)

(52) U.S. Cl.
CPC ............. *F16C 43/02* (2013.01); *D01H 7/041* (2013.01); *F16C 17/04* (2013.01); *F16C 35/10* (2013.01); *F16C 2340/18* (2013.01)

(58) Field of Classification Search
CPC ........ D01H 7/041; D01H 7/042; D01H 7/864; D01H 7/88; F16C 17/04; F16C 35/08;
(Continued)

(56) References Cited

U.S. PATENT DOCUMENTS 4,453,377 A * 6/1984 Inger .................... D01H 15/007
57/279
5,150,566 A * 9/1992 Stenmans ................ D01H 7/04
57/113
(Continued)

FOREIGN PATENT DOCUMENTS

DE 102005035895 A1 * 2/2007 ............... D01H 7/20
EP 1416073 A2 * 5/2004 ............. F16N 7/366

*Primary Examiner* — Phillip A Johnson
(74) *Attorney, Agent, or Firm* — Nelson Mullins Riley & Scarborough LLP

(57) ABSTRACT

Spindle pot bearing for a twisting machine, in particular a two-for-one twisting machine or cabling machine, having a bearing bush for connecting a spindle pot base to a spindle in an interlocking manner in an axial direction. In order to provide a spindle pot bearing for a twisting machine that ensures that the position of the spindle pot on the spindle is reliably secured, it is provided that: a first bearing portion of the bearing bush for connecting, in an interlocking manner in the axial direction, to a first bearing member arranged on the spindle has, at a distance with respect to the direction of the longitudinal axis from a shoulder limiting the first bearing portion, latching protrusions which protrude from an inside of the bearing bush and are movable between a blocking position and an unblocking position; a second bearing portion of the bearing bush, said second bearing portion adjoining the first bearing portion in the direction of the longitudinal axis, is designed for interlockingly connecting to the spindle pot base in such a way that locking in the axial direction is possible; and a blocking is arranged on the spindle pot base, which blocking fixes the latching protrusions in the blocking position when the spindle pot base is in an operating position.

20 Claims, 5 Drawing Sheets

(51) Int. Cl.
*F16C 17/04* (2006.01)
*D01H 7/04* (2006.01)

(58) Field of Classification Search
CPC .......... F16C 35/10; F16C 35/12; F16C 43/02; F16C 2340/18
See application file for complete search history.

(56) References Cited

U.S. PATENT DOCUMENTS

| | | | | |
|---|---|---|---|---|
| 5,347,805 A | * | 9/1994 | Butzke | D01H 15/007 57/279 |
| 2008/0047250 A1 | * | 2/2008 | Fink | D01H 7/88 57/279 |

* cited by examiner

FIG. 5a
FIG. 5b
FIG. 5c
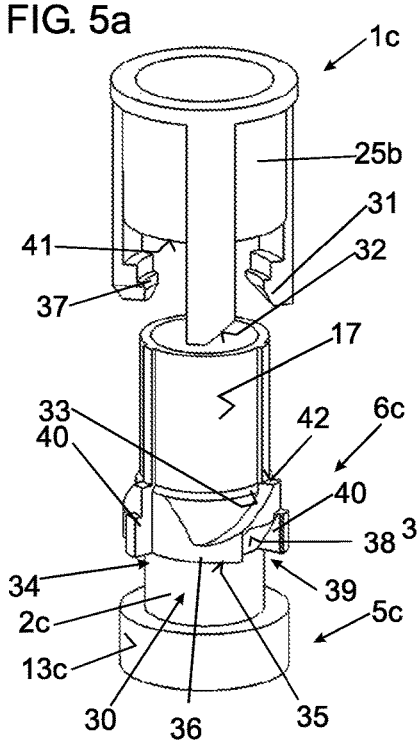
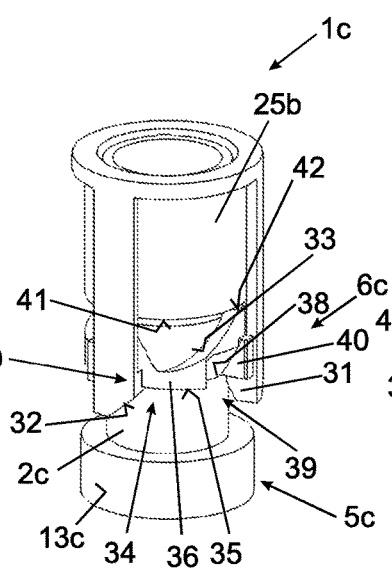
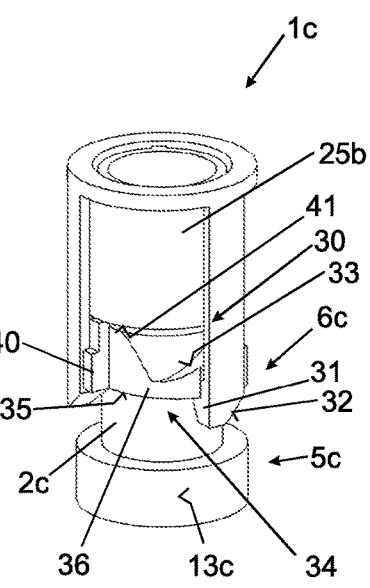

SPINDLE POT BEARING

CROSS-REFERENCE TO RELATED APPLICATIONS

This application claims priority from German National Patent Application No. 10 2019 105 072.3 filed Feb. 28, 2019, entitled "Spulentopflagerung", the entire contents of which are incorporated herein by reference.

FIELD OF THE INVENTION

The invention relates to a spindle pot bearing for a twisting machine, in particular a two-for-one twisting machine or cabling machine, comprising a bearing bush for connecting a spindle pot base to a spindle in an interlocking manner in the direction of the axis of rotation.

BACKGROUND OF THE INVENTION

Known twisting machines, in particular two-for-one twisting machines or cabling machines, have a bearing bush for receiving a spindle pot base of a spindle pot, the bearing bush being arranged on a spindle. The known spindle pot bearings typically use bearing bushes made of a rubber material, the damping material properties of which damp vibrations, caused by the rotation of the spindle, with respect to the spindle pot.

To ensure reliable operation of the twisting machines, it is necessary for the spindle pot arranged on the spindle to be securely locked with respect to the direction of the longitudinal axis of the spindle. It is critical that the spindle pot is secured against lifting off the bearing bush counter to the mounting direction and that the bearing bush is secured against lifting off the bearing members of the spindle. Known mechanisms for securing position, in particular for securing the position of the bearing bush on the bearing member, are based on establishing a frictional connection. However, when processing in particular yarns having a heavy titre, there is the risk, inter alia, of catching between the yarn and the spindle pot as the yarn runs off, as a result of which the spindle pot may be pulled out of its position mounted on the spindle, meaning that not only may the twisting process be interrupted, but also the spindle pot may be damaged.

SUMMARY OF THE INVENTION

The problem addressed by the invention is that of providing a spindle pot bearing for a twisting machine, in particular a two-for-one twisting machine or cabling machine, that ensures that the position of the spindle pot on the spindle is reliably secured.

The invention solves the problem by a spindle pot bearing for a twisting machine comprising: a bearing bush for connecting a spindle pot base to a spindle in an interlocking manner in an axial direction, wherein a first bearing portion of the bearing bush for connecting, in the interlocking manner in the axial direction, to a first bearing member arranged on the spindle has, at a distance with respect to the direction of a longitudinal axis from a shoulder limiting the first bearing portion, latching protrusions which protrude from an inside of the bearing bush and are movable between a blocking position and an unblocking position; a second bearing portion of the bearing bush, said second bearing portion adjoining the first bearing portion in the direction of the longitudinal axis, is designed for interlockingly connecting to the spindle pot base in such a way that locking in the axial direction is possible; and a blocking is arranged on the spindle pot base, which blocking fixes the latching protrusions in the blocking position when the spindle pot base is in an operating position.

Advantageous features of the invention are set forth herein.

By means of the first bearing portion of the bearing bush, the bearing bush is connected to the first bearing member arranged on the spindle. In the assembled state, i.e. when the spindle pot base is in the operating position on the spindle, the bearing bush abuts the first bearing member, which is arranged on the spindle, in the axial direction by a shoulder delimiting the first bearing portion from the second bearing portion, a limit thereby being established with respect to the direction in which the bearing bush is pushed onto the spindle. To prevent displacement in the opposite direction, namely to prevent the bearing bush from undesirably lifting off the spindle, the first bearing portion has latching protrusions, which protrude from an inside of the bearing bush and, when in their blocking position, engage behind the first bearing member on the side remote from the shoulder. The latching protrusions thus prevent the bearing bush from being lifted off the spindle or the bearing member connected to the spindle, i.e. from being moved counter to the mounting direction. The latching protrusions are movable between the blocking position, in which they engage behind the bearing member on the side remote from the shoulder, and an unblocking position, in which the latching protrusions are not engaged with the bearing member and so allow the bearing bush to be removed from the bearing member or the spindle.

When in their blocking position, the latching members ensure that the position of the bearing bush on the first bearing member of the spindle is reliably secured, and thus reliably prevent the bearing bush undesirably lifting off the spindle. To ensure the latching protrusions are reliably positioned in the blocking position, according to the invention a blocking means is arranged on the spindle pot base, which blocking means fixes the latching protrusions in the blocking position when the spindle pot base is in the operating position, i.e. the mounted position on the bearing bush. By way of example, the fixing by means of the blocking means occurs such that the blocking means blocks the latching protrusions from shifting out of the blocking position into the unblocking position. In this case, when the spindle pot base is in the mounted position on the bearing bush, the blocking means is operatively connected to the blocking means, thereby ensuring that during operation the bearing bush is reliably secured in position and reliably secured against lifting off. Removal of the spindle pot base out of the operating position, i.e. shifting of the spindle pot base relative to the bearing bush, causes the blocking means to release the latching protrusions in such a way that they can be shifted out of their blocking position into the unblocking position such that the bearing bush can be replaced if necessary.

In addition to the position of the bearing bush on the bearing member being reliably secured, in the spindle pot bearing according to the invention the bearing bush is also connected to the spindle pot base in such a way that lifting off is prevented. For this purpose, the second bearing portion of the bearing bush, by which the bearing bush abuts a second bearing member, is designed for interlockingly connecting to the spindle pot base. The interlocking connection is configured such that the spindle pot base is prevented from shifting axially relative to the bearing bush by suitable means acting in an interlocking manner in the axial direction. Said means can be locked in their position that interlockingly fixes the spindle pot base in place, it thereby being ensured that the position of the spindle pot base on the bearing bush is reliably secured. The configuration of the interlocking connection between the second bearing portion and the spindle pot base can be designed in any manner; besides a direct connection between the spindle pot base and bearing bush, an interlocking connection can also be established by means of suitable components that can be connected to both the bearing bush and the spindle pot base.

In the operating position, i.e. when a spindle pot is arranged on the spindle, the spindle pot bearing according to the invention reliably ensures that the spindle pot is prevented from undesirably shifting axially relative to the spindle. Interruptions to operation and damage to the spindle pot can thus be reliably prevented. The spindle pots are stably fixed on the spindle and can also be changed, i.e. removed and then locked back on the spindle, without the use of tools.

The configuration and arrangement of the latching protrusions is basically freely selectable. The latching protrusions can be formed by one circumferential protrusion or from a plurality of segments. Particularly preferably, the latching protrusions are arranged in the region of the end face of the first bearing portion of the bearing bush, thereby making it possible to produce the bearing bush in a particularly compact and inexpensive manner. According to a particularly advantageous embodiment of the invention, in the region of the latching protrusions the first bearing portion has supporting elements protruding from an outside of the bearing bush. The supporting elements, e.g. supporting lugs protruding radially outwards in the region of the latching protrusions, which protrude radially inwards, increase the supporting action of the latching protrusions engaged with the first bearing member and thereby particularly reliably ensure securing against axial displacement.

The configuration of the latching protrusions' ability to shift is basically freely selectable. For this purpose, for example, latching elements or O-rings that are movably spring-loaded and connected to the bearing bush can be used. According to an advantageous embodiment of the invention, however, the first bearing portion has recesses, which limit the latching protrusions in the circumferential direction and extend in the direction of the longitudinal axis.

Configuring the first bearing portion of the bearing bush accordingly makes it possible to configure the latching protrusions integrally with the bearing bush, the recesses providing resilient mobility of the latching protrusions between the unblocking position and the blocking position. This development thus allows for a particularly simple and inexpensive configuration of the first bearing portion. The recesses can be slot-like, for example.

To fix the latching protrusions in their blocking position on the first bearing member, the spindle pot base can basically be configured in any manner. According to an advantageous embodiment of the invention, however, the blocking means on the spindle pot base is formed by a circumferential ridge arranged on an underside of the spindle pot base, which ridge abuts the outside of the first bearing portion, while arranged coaxially to the first bearing portion, when the spindle pot base is in the operating position.

The circumferential pot-shaped ridge on the underside of the spindle pot base has sufficient stability so that, when it is arranged to abut the outside of the bearing bush, it can block the latching protrusions from moving towards the unblocking position. When the latching protrusions are configured integrally with the bearing bush, the circumferential ridge prevents resilient movement of the latching protrusions towards the unblocking position. By means of the circumferential ridge, therefore, a particularly simple blocking means is provided, by which reliable arrangement of the latching protrusions in the blocking position is ensured during operation.

Furthermore, particularly advantageously the outside of the first bearing portion, with which outside the ridge provided on the underside of the spindle pot base in accordance with an advantageous development engages in the operating position, has a conical shape. In conjunction with a cylindrical ridge, a conical shape of the outside of the first bearing portion, where said bearing portion is sloped relative to the longitudinal axis by, for example, just a few degrees, in particular three degrees, ensures that when the spindle pot base is removed from the bearing bush the normal force between the spindle pot base and the bearing bush decreases continuously, the bearing bush thereby being particularly reliably prevented from being pulled off by the spindle pot base.

As already mentioned above, the interlocking connection between the second bearing portion and the spindle pot base can basically be configured in any manner. According to a particularly advantageous development of the invention, however, the second bearing portion has latching protrusions protruding from the outside, which are preferably interrupted by slots extending in the direction of the longitudinal axis of the bearing bush, are movable between a blocking position and an unblocking position and can be brought into engagement with a circumferential groove arranged in a receiving opening in the spindle pot base.

According to this embodiment of the invention, the second bearing portion has latching protrusions, similarly to the first bearing portion, which latching protrusions are particularly preferably formed integrally with the bearing bush by means of slots extending in the direction of the longitudinal axis of the bearing bush. The latching protrusions are movable between a blocking position, in which the latching protrusions are interlockingly connected to the spindle pot base in the axial direction, and an unblocking position, in which this interlocking connection is broken. In the operating position, the latching protrusions engage in a groove, which extends coaxially to the longitudinal axis of the bearing bush and is provided on the inside of a receiving opening in the spindle pot base, which receiving opening is provided for the arrangement of the bearing bush. This embodiment of the invention makes the bearing bush particularly simple and inexpensive to produce and is also a convenient option for mounting the spindle pot on and removing the spindle pot from the bearing bush.

According to a further embodiment of the invention, to lock the latching protrusions in the blocking position the second bearing portion is configured to receive a clamping member, in particular a thread brake, in such a way that the clamping member, in particular the thread brake, abuts the inside of the bearing bush and locks the latching protrusions of the second bearing portion in the blocking position. By arranging a thread brake or a plug-shaped clamping member matched to the internal diameter of the second bearing portion, the latching protrusions are blocked from shifting towards the unblocking position. This embodiment of the bearing bush, in particular the use of a thread brake as a clamping member, makes it possible to reliably secure the position of the spindle pot on the bearing bush; embodiments in which the thread brake is suitable as a clamping member make it possible to do without additional clamping members in twisting machines that use thread brakes.

According to a further embodiment of the invention, the second bearing portion has, in the region between the latching protrusions and the first bearing portion with respect the direction of the longitudinal axis, an annular ridge protruding from the inside of the bearing bush. The ridge, which for example is formed integrally with the bearing bush, forms a reduction, provided with a through-opening, of the internal cross section of the bearing bush, although said cross section provides a sufficiently large through-opening for a thread path. By means of the reduction achieved within the bearing bush by means of the ridge, the region of the bearing bush that is in contact with the bearing members and is, for example, loaded with lubricants can be isolated with respect to the thread and/or the remaining region of the bearing bush, for example with respect to the region in which a thread brake is arranged as a clamping member in accordance with an advantageous development of the invention. In the case of a cylindrical configuration of the inner surface of the second bearing portion, reliable locking of the latching protrusions of the second bearing portion can be ensured where necessary by a simple adaptation of the thread brake.

According to a further embodiment of the invention, the spindle pot bearing has, for interlocking connection to the spindle pot base, a connection sleeve that can be mounted on the bearing bush and can be releasably connected to the bearing bush. The use of a connection sleeve allows for a particularly simple configuration of the bearing bush and particularly reliably prevents the escape of lubricants, since it is possible to do without a configuration having latching protrusions, for example as the result of the introduction of slots which would allow lubricant to pass through, on the second bearing portion. The configuration of the connection of the connection sleeve to the bearing bush such that they are locked against one another in a stationary manner in the direction of the longitudinal axis is basically freely selectable, said connection being configured such as to reliably ensure that the connection sleeve is not released from the bearing bush during operation, which would lead to undesirable axial shifting of the spindle pot.

According to an advantageous embodiment of the invention, the connection sleeve can be interlockingly connected to the bearing bush by means of retaining members that protrude from an inside of the connection sleeve and engage behind a ridge on the inside of the bearing bush, the retaining members being movable between a latching position and a removal position.

This embodiment of the invention provides that the interlocking connection between the connection sleeve and the bearing bush is brought about by means of retaining members which are arranged on the connection sleeve and which engage behind a ridge protruding internally from the bearing bush. In this case, the retaining members are movable between a latching position and a removal position, such that if necessary the connection sleeve interlockingly connected to the bearing bush can be removed from the bearing bush. The retaining members can be implemented by means of suitable hook-shaped protrusions which engage behind the ridge of the bearing bush when the connection sleeve is in the mounted position on the bearing bush. When the protrusions shift into the unblocking position, they disengage from the circumferential ridge on the inside of the bearing bush, and so the connection sleeve can be pulled off the bearing bush. Particularly advantageously, the protrusions are resilient and are preloaded towards the latching position when in the unloaded position such that automatic locking takes place when the connection sleeve is mounted on the bearing bush.

In order to prevent the connection sleeve and bearing bush undesirably separating when the connection sleeve is in the mounted position on the bearing bush, according to an advantageous development of the invention the connection sleeve is configured to receive a clamping member, in particular a thread brake, in such a way that the clamping member, in particular the thread brake, abuts an inside of the connection sleeve and locks the retaining members in the latching position. In the mounted position on the spindle pot, the clamping member or thread brake abuts an inside of the connection sleeve and thus prevents the retaining members from shifting out of their latching position into the removal position, the clamping member or the thread brake preferably being supported against the inside of the connection sleeve over the entire circumference in the region of the retaining members.

To prevent the spindle pot base lifting off the bearing bush, i.e. moving counter to the mounting direction, in the case of a spindle pot bearing formed by a connection sleeve and a bearing bush, the connection bush can basically be configured in any manner. According to an advantageous embodiment, however, the connection sleeve has a hold-down device, in particular a circumferential flange, that can be arranged on a top side of the spindle pot base. According to this embodiment of the invention, when the spindle pot base is in the mounted position on the connection sleeve and the bearing bush, the hold-down device lies on a top side of the spindle pot base by means of a hold-down device protruding radially from the connection sleeve, preferably by means of a circumferential flange, and thus locks the spindle pot base in the axial direction between the bearing bush, preferably a circumferential shoulder of the bearing bush, and the hold-down device, preferably a circumferential flange. By means of the hold-down device and the interlocking connection in the axial direction between the bearing bush and the connection sleeve, a reliable spindle pot bearing is formed, in the case of which it is ensured that the spindle pot base cannot be pulled off the bearing bush.

According to a further embodiment of the spindle pot bearing, the bearing bush has retaining portions, which are arranged on the outside and are designed to releasably lock retaining members arranged on the connection sleeve, the retaining portions and the retaining members being designed such that the retaining members automatically reach a locking position together with the retaining portions when the connection sleeve is mounted onto the bearing bush and that the retaining members are moved along the retaining portions into a removal position by means of movement of the connection sleeve relative to the bearing bush.

According to this embodiment of the spindle pot bearing, the position of the connection sleeve on the bearing bush is secured in the axial direction, counter to the direction in which the connection sleeve is mounted on the bearing bush, by retaining portions which are arranged on the outside of the bearing bush and which are engaged with retaining members on the connection sleeve in the mounted position. The retaining portions and the retaining members are designed such that the retaining members automatically reach a locking position on the retaining portions when the connection sleeve is mounted onto the bearing bush in the axial direction. The retaining portions are configured such that, to release the connection between the connection sleeve and the bearing bush, the connection sleeve is rotated relative to the bearing bush, the retaining members being moved on the retaining portions until the retaining members reach a portion of the retaining portions in which the retaining members can be pulled off the retaining portions out of the removal position the retaining members have then assumed.

This embodiment of the invention makes it possible to ensure secure locking of the connection sleeve on the bearing bush without any additional securing means, such as clamping means. This configuration of the connection reliably prevents the connection inadvertently releasing due to increased axial loads acting on the connection sleeve in the pulling-off direction. Separating the connection sleeve and bearing bush first requires defined rotation of the connection sleeve relative to the bearing bush, in the event of which the retaining members of the connection sleeve reach the removal position. A deliberate movement of this kind is required in order to allow the connection sleeve to be pulled off the bearing bush.

A configuration of the bearing bush and the connection sleeve in the case of which automatic locking on the retaining portions takes place when the connection sleeve is mounted and in the case of which rotation is required in order to allow the connection sleeve to be removed from the bearing bush is basically freely selectable. According to a particularly advantageous embodiment of the invention, however, the retaining members have a stop surface, which extends obliquely to the mounting direction and can, upon mounting, be brought into engagement with a guide surface, which extends correspondingly obliquely to the mounting direction and tapers towards the outside of the bearing bush in the mounting direction.

According to this embodiment of the invention, the retaining members have stop surfaces which extend obliquely to the mounting direction and which engage with a corresponding guide surface in the region of the retaining portions of the bearing bush. The oblique configuration of the retaining members first ensures that, during mounting, the connection sleeve engages with the bearing bush with such rotation in the circumferential direction that, following complete mounting, the retaining members are arranged in a region of the retaining portions in which the retaining members are locked on the retaining portion.

The guide surfaces tapering towards the outside of the bearing bush allow for particularly simple and reliable mounting of the connection sleeve on the bearing bush. This is the case in particular when, according to an advantageous development of the invention, the retaining portion has a latching portion comprising a shoulder for a latching protrusion on the retaining member, the shoulder having a latching surface, and the retaining portion has a removal portion formed by a ramp extending obliquely to the longitudinal axis on the outside of the bearing bush. During mounting, the retaining members are shifted radially over the outwardly tapering guide surface in the region of the latching portion and are thereby guided over the shoulder in a controlled manner until the latching protrusion on the retaining member abuts the latching surface of the shoulder. The connection between the latching surface and the latching protrusion reliably blocks axial shifting of the connection sleeve away from the bearing member in the pulling-off direction.

For removal, the connection sleeve is rotated relative to the bearing bush and in the process the latching protrusions reach the removal portion of the retaining portions, which have a ramp rising in the pulling-off direction, whereby the latching protrusions can be pulled off the retaining portion by further radial shifting, since in the region of the removal portions the latching protrusions are not engaged with the shoulder on the latching portion.

To ensure particularly reliable movement of the rotatable connection sleeve relative to the bearing bush between the latching portion and the removal portion, according to a particularly advantageous embodiment of the invention the retaining portions are delimited from one another by stops, which limit a rotational movement of the connection sleeve between the locking position and the removal position. By means of the stops, therefore, it is reliably ensured that, following defined rotation, set by the stops, out of the region of the latching portion, the latching protrusions of the retaining members are arranged in the removal position such that the connection sleeve can then be pulled off the bearing bush by corresponding axial shifting. Movement of the retaining members beyond the removal portion in the event of rotation out of the latching portion is reliably prevented by this embodiment of the invention, as a result of which the connection sleeve can be removed from the bearing bush in a particularly simple manner.

To limit the movement of the connection sleeve onto the bearing bush during mounting, according to a further embodiment of the invention the bearing bush has an end stop, which can be brought into abutment with a stop surface on the connection sleeve. A corresponding configuration ensures particularly reliable and simple mounting and secure positioning of the connection sleeve on the bearing bush, the connection sleeve in turn securing the spindle pot base on the bearing bush in the axial direction by means of suitable surfaces.

BRIEF DESCRIPTION OF THE DRAWINGS

The present invention will become more fully understood from the detailed description and the accompanying drawings, which are not necessarily to scale.

Embodiment examples of the invention are explained below with reference to the drawings, in which:

FIG. 5a shows a perspective view of a third embodiment of a spindle pot bearing, comprising a bearing bush and a connection sleeve in the disassembled state;

FIG. 5b shows a perspective view of the connection bush and the bearing bush of FIG. 5a in an assembled position located in a locking position, and FIG. 5c shows a perspective view of the bearing bush and the connection bush of FIG. 5a in the assembled state relative to one another in their removal position.

DESCRIPTION OF THE PREFERRED EMBODIMENTS

Figure 1:
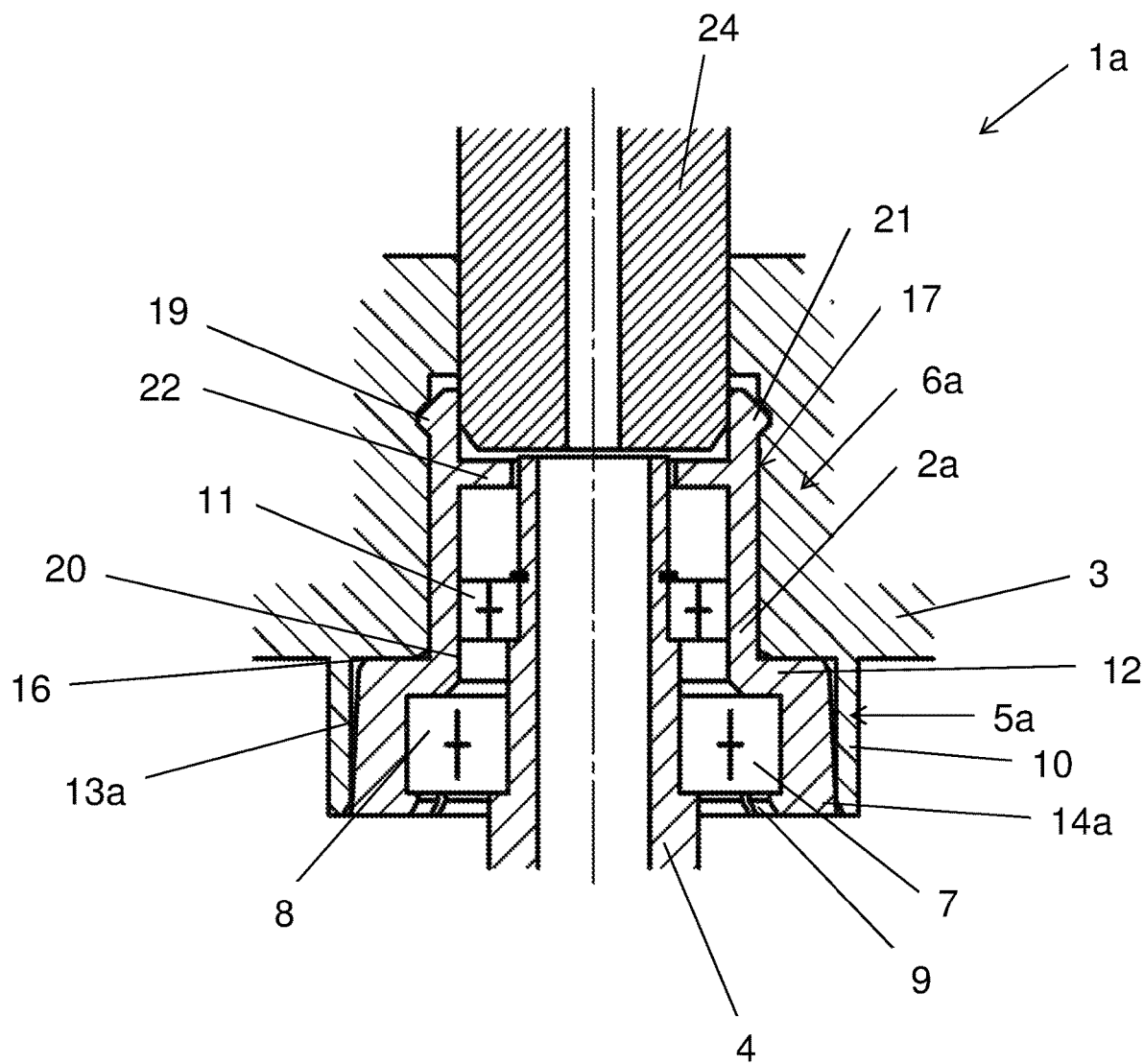
FIG. 1 shows a sectional view of a first embodiment of a spindle pot bearing, comprising a bearing bush arranged on a spindle and a spindle pot base arranged on the bearing bush.
Figure 2:
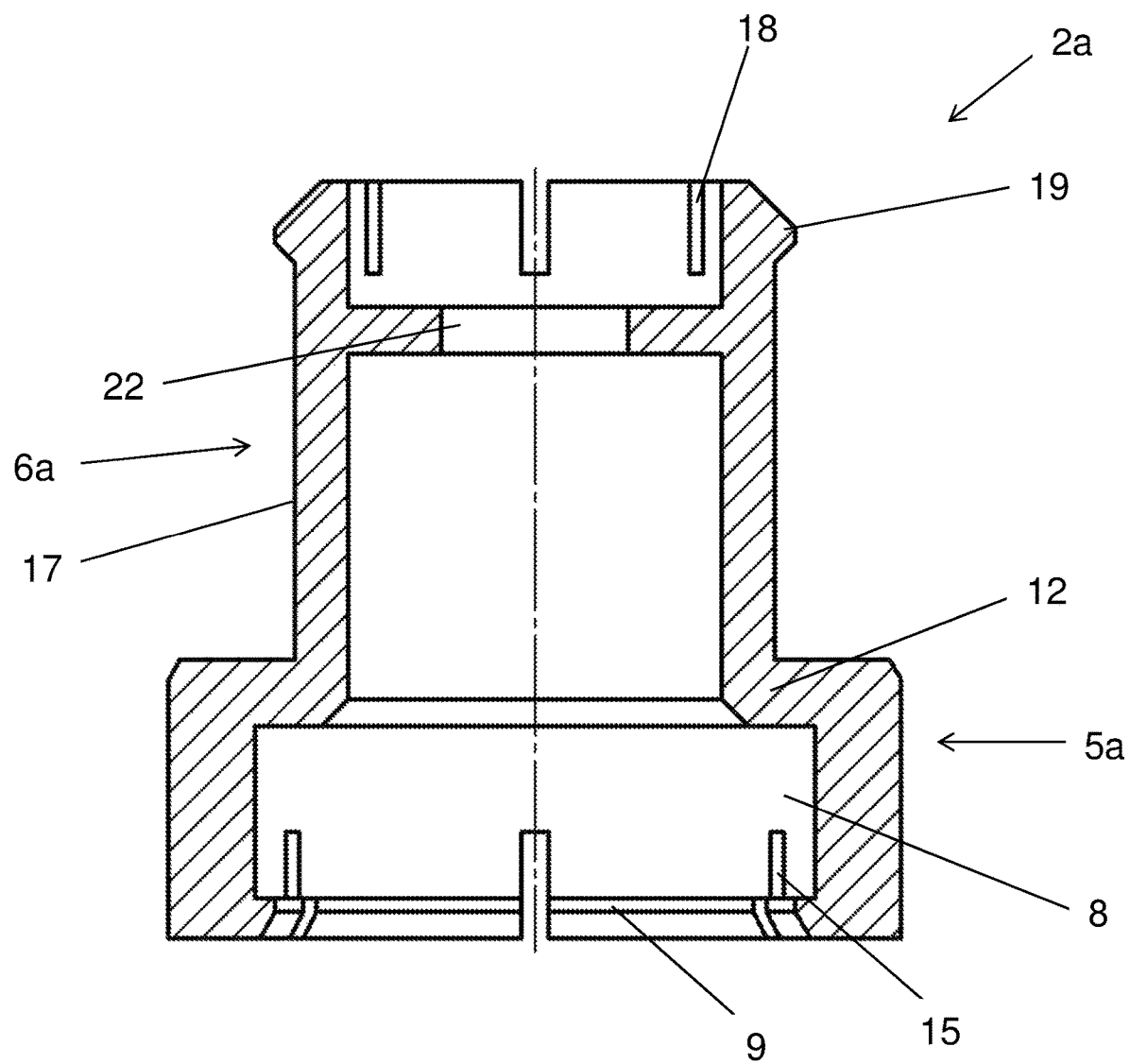
FIG. 2 shows a perspective illustration of a sectional view of the bearing bush of the spindle pot bearing of FIG. 1.

FIG. 1 shows a spindle pot bearing 1a produced from a spindle pot base 3 and a bearing bush 2a, which is shown in FIG. 2. To be rotatably connected to a first bearing member 7 and a second bearing member 11 of a spindle 4, the bearing bush 2a has a first bearing portion 5a for connection to the first bearing member 7 and a second bearing portion 6a for connection to the second bearing member 11. In the operating position shown in FIG. 1, in which the bearing bush 2a is interlockingly connected to the first bearing member 7 in the axial direction, a shoulder 12 of the first bearing portion 5a abuts a top side of the first bearing member 7.

To secure the operating position shown in FIG. 1 after the bearing bush 2a has been mounted on the bearing members 11, 7, the first bearing portion 5a has, at its end remote from the second bearing portion 6a, latching protrusions 9, which protrude from an inside 8 of the bearing bush 2a and, in the operating position, engage behind the first bearing member 7 on the side remote from the shoulder 12. The latching protrusions 9 are distributed on the bearing bush 2a in the circumferential direction and are formed integrally with the bearing bush 2a.

To ensure that the latching protrusions 9 can move between the blocking position of the latching protrusions 9 as shown in FIG. 1 and an unblocking position, in which the latching protrusions 9 are not engaged with the bearing member 7, the first bearing portion 5a has recesses 15, which extend from the end of the bearing bush 2a remote from the second bearing portion 6a in the direction of the longitudinal axis of the bearing bush and allow the latching members 9 to be formed integrally with the bearing bush 2a.

In the region of the outside 13a of the first bearing portion 5a, the bearing bush 2a furthermore has supporting elements 14a, which are arranged opposite the latching protrusions 9 in the radial direction and support the latching action of the latching protrusions 9. To secure the position of the latching protrusions 9 in their blocking position shown in FIG. 1, the outside 13a of the first bearing portion 5a is in contact with a ridge 10 protruding from an underside 16 of the spindle pot base 3, the ridge 10 acting as a blocking element and preventing resilient movement of the latching protrusions 9 into the unblocking position. In the operating position, the ridge 10 coaxially abuts the outside 13a of the first bearing portion 5a of the bearing bush 2a. In the position shown, therefore, the bearing bush 2a is secured in the operating position after being mounted on the bearing members 7, 11.

Once the bearing bush 2a has been arranged on the bearing members 7, 11, the spindle pot base 3 is positioned in the operating position shown in FIG. 1. To secure the spindle pot base 3 on the bearing bush 2a, in the region of the second bearing portion 6a the bearing bush 2a has latching protrusions 19 protruding from an outside 17 of the second bearing portion 6a. The latching protrusions 19 are formed integrally with the bearing bush 2a and are movable between an unblocking position and a blocking position, similarly to the latching protrusions 9 of the first bearing portion 5a. The mobility of the latching protrusions 19 formed integrally with the bearing bush 2a is achieved by means of slots 18, which extend in the direction of the longitudinal axis in the region of the second bearing portion 6a, from an end of the bearing bush 2a remote from the first bearing portion 5a towards the first bearing portion 5a. In the operating position, the latching protrusions 19 are arranged in a groove 21 made circumferentially in a receiving opening 20 in the spindle pot 3 and thus secure the position of the spindle pot base 3 in the axial direction on the bearing bush 2a. To secure the position of the latching protrusions 19 in the groove 21, a thread brake 24 can be inserted into the bearing bush 2a in such a way that the thread brake 24 locks the latching protrusions 19 in their blocking position.

The bearing bush 2a being pulled off from the spindle 4 or the spindle pot base 3 being pulled off from the bearing bush 2a is reliably prevented by the spindle pot bearing 1 shown. To remove the spindle pot base 3, it is first necessary to withdraw the thread brake 24 from the first bearing portion 6a of the bearing bush 2a. Subsequently, the spindle pot base 3 can be lifted off the bearing bush 2a while bending the latching protrusions 19; a conical outside 3a of the first bearing portion 5a, preferably sloped by 3°, prevents the bearing bush 2a from being lifted off the spindle 4 by the spindle pot base 3 as the spindle pot base 3 is lifted off, since the conical configuration means that the normal force between the spindle pot base 3 and the bearing bush 2a continuously decreases as the spindle pot base 3 is removed.

Above the second bearing member 11, a circumferential ridge 22 is arranged, which protrudes from an inside 8 of the bearing bush 2a. The ridge 22 separates the region of the bearing bush 2a in which the bearing members 7, 11 are arranged from the adjoining region provided for receiving the thread brake, so that the region having lubricants at the bearings 7, 11 is separated from the region of the thread brake 24.

Figure 3:
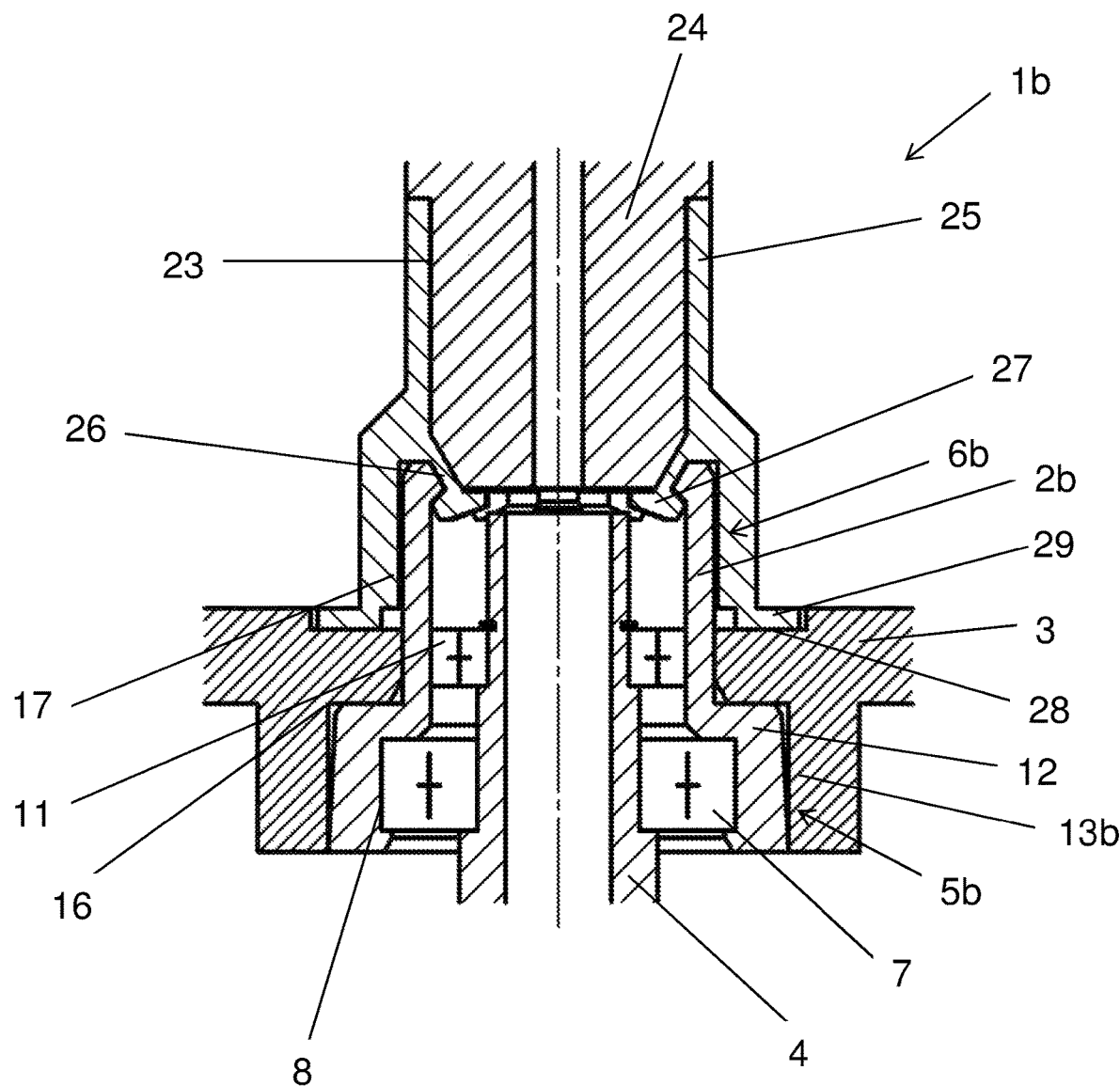
FIG. 3 shows a sectional view of a second embodiment of a spindle pot bearing, comprising a bearing bush arranged on a spindle, a connection sleeve arranged on the bearing bush and a spindle pot base arranged on the bearing bush and the connection bush.
Figure 4:
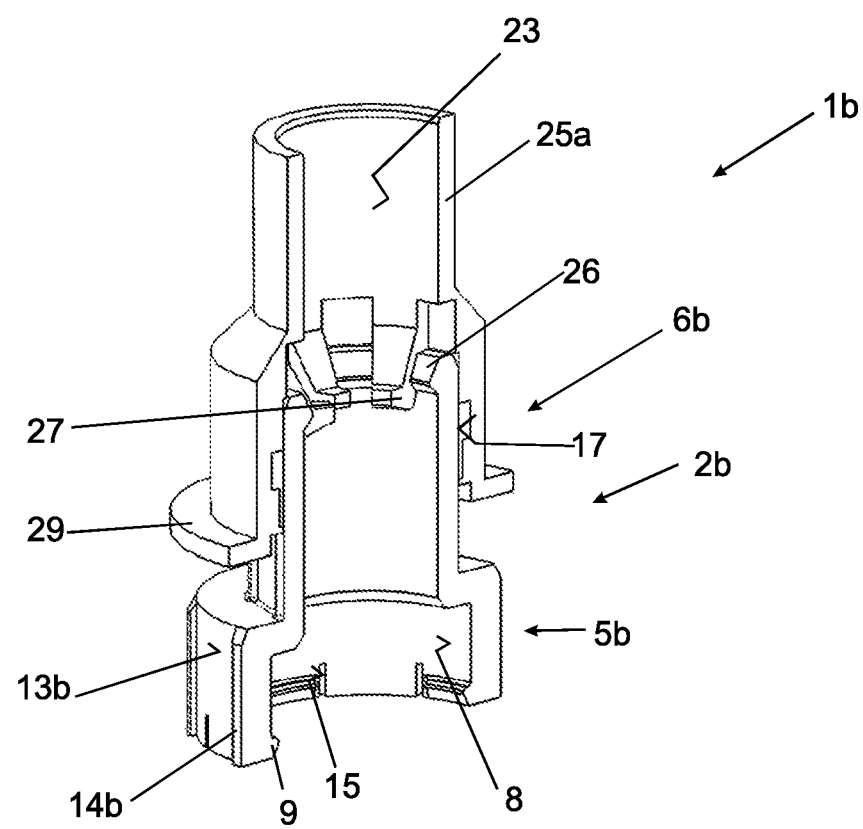
FIG. 4 shows a perspective view of a sectional illustration of the bearing bush and the connection sleeve of FIG. 3 in the assembled state.

In the second embodiment of the spindle pot bearing 1b shown in FIGS. 3 and 4, similarly to the spindle pot bearing 1a shown in FIGS. 1 and 2, the bearing bush 2b is arranged on the bearing members 7, 11 of the spindle 4 and is secured against lifting off counter to the mounting direction of the bearing bush 2b by the ridge 10 that extends from the underside 16 of the spindle pot base 3.

Alternatively to the latching protrusions 19 provided in the first spindle pot bearing 1a for securing the position of the spindle pot base 3 on the bearing bush 2a, the spindle pot bearing 1b in the embodiment shown in FIGS. 3 and 4 has a connection sleeve 25a connected to the bearing bush 2b. To fix the connection sleeve 25a in place in the axial direction on the bearing bush 2b, the connection sleeve 25a has retaining members 27 extending from its inside 23 which are movable between the latching position shown in FIG. 3 and a removal position.

In the latching position, in which the connection sleeve 25a is secured on the bearing bush 2b by means of the retaining members 27, the retaining members 27 engage behind a ridge 26 which protrudes from an inside 8 of the bearing bush 2b and is arranged in the region of the end of the bearing bush 2b remote from the first bearing portion 5b. The retaining members 27 extend obliquely to the direction of the longitudinal axis and thus allow for convenient mounting of the connection sleeve 25a on the bearing bush 2b, the retaining members 27 engaging on the bearing bush 2b as the connection bush 25a is mounted. The retaining members 27 formed integrally with the connection sleeve 25a can be resiliently shifted due to recesses delimiting the retaining members 27 from one another, and so the connection sleeve 25a can be removed and the retaining members 27 can be shifted into the removal position.

To secure the position of the retaining members 27 in the operating position shown in FIG. 3, a thread brake 24 is arranged at the connection sleeve 25a in such a way that the thread brake 24 abuts the inside of the connection sleeve 25a and thus blocks the retaining members 27 from shifting into their removal position.

To secure the position of the spindle pot base 3 on the bearing bush 2b and connection sleeve 25a, the connection sleeve 25a has, on its lower end in relation to the installation position, a radially protruding flange 29, which acts as a hold-down device, abuts a top side 28 of the spindle pot base 3 and secures the spindle pot base 3 in its position on the bearing bush 2b. For the mounting of the spindle pot base 3 on the bearing bush 2b, the connection sleeve 25a can either be connected to the spindle pot base 3 beforehand or be loose.

If the connection sleeve 25a is not connected to the spindle pot base 3, the mounting is carried out such that the spindle pot base 3 is mounted on the bearing bush 2a after the bearing bush 2b has been mounted on the bearing members 7, 11. Subsequently, the connection sleeve 25a is mounted onto the bearing bush 2a until the retaining members 27 engage behind the ridge 26 and the flange 29 abuts the top side 28 of the spindle pot base 3. By means of its outer contour, the thread brake 24 arranged in the connection sleeve 25a stops the retaining members 27 shifting into their removal position. Thus, the connection sleeve 25a is prevented from lifting off the bearing bush 2a and the flange 29 attached to the connection sleeve 25a prevents the spindle pot base 3 lifting off the bearing bush 2a.

Alternatively, the connection sleeve can be already connected to the spindle pot base 3 by means of a screwed or adhesive connection, for example. The connection sleeve 25a connected to the spindle pot base 3 is then mounted onto the bearing bush 2a. Simultaneously during the assembly, the retaining members 27 engage with the ridge 26 and the latching protrusions 9 engage with the first bearing member 5a and these lock together.

FIGS. 5a to 5c show a further embodiment of a spindle pot bearing 1c. To connect the bearing bush 2c to the connection sleeve 25b, the second bearing portion 6c of the bearing bush 2c has retaining portions 30 distributed on its outside 17 over the circumference. The retaining portions 30 have a shoulder 36 protruding from the outside 17 of the bearing bush 2c for forming a latching surface 35, which extends perpendicularly to the outside 17 of the second bearing portion 6c. The individual retaining portions 30 are separated from one another by stops 40 protruding perpendicularly from the shoulders 36. In addition to the latching portions 34 formed by the shoulders 36, the retaining portions 30 each have a removal portion 39 adjacent to the latching portions 34 in the circumferential direction. The removal portions 39 are formed as ramps 38, which rise from an outside 17 of the bearing bush 2c to a top side of the shoulder 36 in the pulling-off direction of the connection sleeve 25b.

Furthermore, the retaining portions 30 also have guide surfaces 33 extending obliquely to the push-on direction, the guide surfaces 33 tapering towards the top side of the shoulder 36 in the push-on direction of the connection sleeve 25b.

The connection sleeve 25b in turn has retaining members 31 extending in the push-on direction and having latching protrusions 37, which abut a latching surface 35 of the shoulders 36 in the operating position. The retaining members 31 also have stop surfaces 32, which can be brought into engagement with the guide surface 33 and extend correspondingly obliquely.

When the connection sleeve 25b is assembled onto the bearing bush 2c, i.e. when the connection sleeve 25b is mounted onto the bearing bush 2c, the stop surfaces 32 of the retaining members 31 come into contact with the guide surface 33 on the retaining portions 30. As a result of the interaction of the guide surface 33 with the stop surface 32, the retaining members 31 are guided, following radial movement, into the position shown in FIG. 5b, in which the latching protrusions 37 abut the latching surface 35 and, in the circumferential direction, the stops 40.

Two steps are required to release the connection between the connection sleeve 25b and the bearing bush 2c. Firstly, the connection sleeve 25b has to be rotated towards the removal portion 39 having the ramp 38 until the latching protrusion 37 is arranged in the removal portion 39. In the region of the removal portions 39, the ramp 38 allows the connection sleeve 25b to be pulled off the bearing bush 2c, since the latching protrusions 37 no longer abut the latching surface 35 and thus the latching protrusions 37 can be removed from the retaining portions 30 by means of the ramp 38 by radial shifting of the latching protrusions 37.

In the push-on direction, the shifting of the connection sleeve 25b towards the bearing bush 2c is limited by an end stop 42 arranged on the retaining portions 30. In an end position when the connection sleeve 25b is fully mounted on the bearing bush 2c and is in its operating position, the end stop 42 abuts a stop surface 41 on the connection sleeve 25b.

LIST OF REFERENCE SIGNS

| | |
|---|---|
| 1a, 1b, 1c | Spindle pot bearing |
| 2a, 2b, 2c | Bearing bush |
| 3 | Spindle pot base |
| 4 | Spindle |
| 5a, 5b, 5c | First bearing portion |
| 6a, 6b, 6c | Second bearing portion |
| 7 | First bearing member |
| 8 | Inside of bearing bush |
| 9 | Latching protrusions |
| 10 | Blocking means (ridge) |
| 11 | Second bearing member |
| 12 | Shoulder |
| 13a, 13b, 13c | Outside (bearing bush) of first bearing portion |
| 14a, 14b | Supporting elements |
| 15 | Recess (first bearing portion) |
| 16 | Underside of spindle pot base |
| 17 | Outside of second bearing portion (bearing bush) |
| 18 | Slot (second bearing portion) |
| 19 | Latching protrusions (outside of second bearing portion) |
| 20 | Receiving opening (spindle pot base) |
| 21 | Groove |
| 22 | Ridge |
| 23 | Inside of connection sleeve |
| 24 | Thread brake |
| 25a, 25b | Connection sleeve |
| 26 | Ridge |
| 27 | Retaining member |
| 28 | Top side of spindle pot base |
| 29 | Hold-down device/flange |
| 30 | Retaining portions |
| 31 | Retaining member |
| 32 | Stop surface of retaining member |
| 33 | Guide surface |
| 34 | Latching portion |
| 35 | Latching surface |
| 36 | Shoulder |
| 37 | Latching protrusion |
| 38 | Ramp |
| 39 | Removal portion |
| 40 | Stops |
| 41 | Stop surface |
| 42 | End stop |

What is claimed is:

1. A spindle pot bearing for a twisting machine comprising:
a bearing bush for connecting a spindle pot base to a spindle in an interlocking manner in an axial direction, wherein
a first bearing portion of the bearing bush for connecting, in the interlocking manner in the axial direction, to a first bearing member arranged on the spindle has, at a distance with respect to the direction of a longitudinal axis from a shoulder limiting the first bearing portion, latching protrusions which protrude from an inside of the bearing bush and are movable between a blocking position and an unblocking position, a second bearing portion of the bearing bush, said second bearing portion adjoining the first bearing portion in the direction of the longitudinal axis, and a blocking is arranged on the spindle pot base, wherein the blocking fixes the latching protrusions in the blocking position when the spindle pot base is in an operating position.

2. The spindle pot bearing according to claim 1, wherein the twisting machine is a two-for-one twisting machine or cabling machine.

3. The spindle pot bearing according to claim 1, characterised in that, in a region of the latching protrusions, the first bearing portion has supporting elements protruding from an outside of the bearing bush.

4. The spindle pot bearing according to claim 3, characterised in that the outside of the first bearing portion has a conical shape.

5. The spindle pot bearing according to claim 1, characterised in that the first bearing portion has recesses, which limit the latching protrusions in a circumferential direction and extend in the direction of the longitudinal axis.

6. The spindle pot bearing according to claim 1, characterised in that the blocking is formed by a circumferential ridge arranged on an underside of the spindle pot base, wherein the ridge abuts the outside of the first bearing portion, while arranged coaxially to the first bearing portion, when the spindle pot base is in the operating position.

7. The spindle pot bearing according to claim 1, characterised in that the second bearing portion has latching protrusions protruding from the outside, which are interrupted by slots extending in the direction of the longitudinal axis of the bearing bush, are movable between a blocking position and an unblocking position and are brought into engagement with a circumferential groove arranged in a receiving opening in the spindle pot base.

8. The spindle pot bearing according to claim 1, characterised in that the second bearing portion has, in the region between the latching protrusions and the first bearing portion with respect the direction of the longitudinal axis, an annular ridge protruding from the inside of the bearing bush.

9. The spindle pot bearing according to claim 1, characterised in that the second bearing portion is configured to receive a clamping member in such a way that the clamping member abuts the inside of the bearing bush and locks the latching protrusions of the second bearing portion in the blocking position.

10. The spindle pot bearing according to claim 9, wherein the clamping member is a thread brake.

11. The spindle pot bearing according to claim 1, characterised by a connection sleeve that is mounted on the bearing bush and is releasably connected to the bearing bush.

12. The spindle pot bearing according to claim 11, characterised in that the connection sleeve is interlockingly connected to the bearing bush by retaining members that protrude from an inside of the connection sleeve and engage behind a ridge on the inside of the bearing bush, the retaining members being movable between a latching position and a removal position.

13. The spindle pot bearing according to claim 12, characterised in that the retaining members have a stop surface, which extends obliquely to the mounting direction and, upon mounting, is brought into engagement with a guide surface, which extends correspondingly obliquely to the mounting direction and tapers towards the outside of the bearing bush in the mounting direction.

14. The spindle pot bearing according to claim 11, characterised in that the connection sleeve is configured to receive a clamping member in such a way that the clamping member abuts an inside of the connection sleeve and locks the retaining members in the latching position.

15. The spindle pot bearing according to claim 14, wherein the clamping member is a thread brake.

16. The spindle pot bearing according to claim 11, characterised in that the bearing bush has an end stop, which is brought into abutment with a stop surface on the connection sleeve, for limiting the mounting movement of the connection sleeve onto the bearing bush.

17. The spindle pot bearing according to claim 1, characterised in that the connection sleeve has a hold-down device in a form of a circumferential flange that is arranged on a top side of the spindle pot base.

18. The spindle pot bearing according to claim 1, characterised in that the bearing bush has retaining portions, which are arranged on the outside and releasably lock retaining members arranged on a connection sleeve, the retaining portions and the retaining members being designed such that the retaining members automatically reach a locking position together with the retaining portions when the connection sleeve is mounted onto the bearing bush and that the retaining members are moved along the retaining portions into a removal position by rotation of the connection sleeve relative to the bearing bush.

19. The spindle pot bearing according to claim 18, characterised in that the retaining portion has a latching portion comprising a shoulder for a latching protrusion on the retaining member, the shoulder having a latching surface, and the retaining portion has a removal portion formed by a ramp extending obliquely to the longitudinal axis on the outside of the bearing bush.

20. The spindle pot bearing according to claim 18, characterised in that the retaining portions are delimited from one another by stops, which limit a rotational movement of the connection sleeve between the locking position and the removal position.

* * * * *